(12) United States Patent
LaRue et al.

(10) Patent No.: US 10,242,313 B2
(45) Date of Patent: Mar. 26, 2019

(54) JOINT PROXIMITY ASSOCIATION TEMPLATE FOR NEURAL NETWORKS

(71) Applicants: James LaRue, Hanahan, SC (US);
Denise LaRue, Hanahan, SC (US)

(72) Inventors: James LaRue, Hanahan, SC (US);
Denise LaRue, Hanahan, SC (US)

( * ) Notice: Subject to any disclaimer, the term of this patent is extended or adjusted under 35 U.S.C. 154(b) by 613 days.

(21) Appl. No.: 14/335,862

(22) Filed: Jul. 18, 2014

(65) Prior Publication Data
US 2016/0019454 A1    Jan. 21, 2016

(51) Int. Cl.
| G06F 17/30 | (2006.01) |
| G06N 3/08 | (2006.01) |
| G06N 3/04 | (2006.01) |

(52) U.S. Cl.
CPC ............. *G06N 3/08* (2013.01); *G06N 3/0445* (2013.01)

(58) Field of Classification Search
CPC .......... G06N 3/08; G06N 3/0445; G06N 3/04; G06N 3/063; H03M 1/38; G11C 13/00; G11C 11/54; G11C 13/0007; G11C 11/16; G11C 15/02; G11C 15/046; G11C 13/004
USPC .......................................................... 706/25
See application file for complete search history.

(56) References Cited

U.S. PATENT DOCUMENTS

| 3,638,196 | A | * | 1/1972 | Nishiyama | ............... | G06F 7/023 |
| | | | | | | 192/113.1 |
| 5,092,343 | A | * | 3/1992 | Spitzer | ................. | A61B 5/0488 |
| | | | | | | 128/925 |
| 5,140,670 | A | * | 8/1992 | Chua | ........................ | G06N 3/04 |
| | | | | | | 706/20 |
| 5,165,009 | A | * | 11/1992 | Watanabe | .............. | G06N 3/063 |
| | | | | | | 706/41 |
| 5,257,389 | A | * | 10/1993 | Liu | ...................... | G06K 9/6202 |
| | | | | | | 345/418 |
| 5,336,937 | A | * | 8/1994 | Sridhar | ................ | G06N 3/0635 |
| | | | | | | 326/112 |
| 5,479,579 | A | * | 12/1995 | Duong | ................. | G06N 3/0635 |
| | | | | | | 706/20 |
| 5,588,090 | A | * | 12/1996 | Furuta | .................... | G06N 3/063 |
| | | | | | | 706/25 |

(Continued)

OTHER PUBLICATIONS

Zhang, Bai-ling; Zhang Haihong and Ge, Shuzhi Sam. "Face Recognition by Applying Wavelet Subband Representation and Kernel Associative Memory". Jan. 1, 2004. IEEE Transactions on Neural Networks, vol. 15, No. 1. pp. 166-177.*

*Primary Examiner* — Sheree Brown

(57) ABSTRACT

A technical solution is described for implementing a computer-executed system of association memory matrices to replace the proximal layers of a convolutional neural network (CNN). An example method includes configuring one Associative Memory Matrix (AMM) for each configured layer in the CNN. This one-to-one conversion method motivates the name to the product: the Joint Proximity Association Template (JPAT) for Neural Networks. The invention is a numerically stable soft-ware based implementation that (1) reduces the long training times, (2) reduces the execution time, and (3) produces bidirectional intra-layer connections and potentially, inter-layer connections as well. The method further includes, potentially, forming a single AMM, from the multiple AMMs corresponding to the multiple and proximal layers of the CNN, in anticipation of the well-known Universal Approximation Theorem.

3 Claims, 5 Drawing Sheets

JPAT: a Joint Proximity Association Template

(56) References Cited

U.S. PATENT DOCUMENTS

| | | | | |
|---|---|---|---|---|
| 5,822,742 | A * | 10/1998 | Alkon | G06K 9/4628 382/159 |
| 6,195,497 | B1 * | 2/2001 | Nagasaka | G06F 17/3079 345/418 |
| 6,389,404 | B1 * | 5/2002 | Carson | G06N 3/063 706/18 |
| 6,844,582 | B2 * | 1/2005 | Ueda | G06N 3/0635 257/295 |
| 7,085,749 | B2 * | 8/2006 | Matsugu | G06K 9/00973 327/355 |
| 7,251,637 | B1 * | 7/2007 | Caid | G06F 17/30256 706/15 |
| 7,409,372 | B2 * | 8/2008 | Staelin | G06N 3/08 706/15 |
| 7,577,020 | B2 * | 8/2009 | Chung | G11C 11/16 365/148 |
| 7,702,599 | B2 * | 4/2010 | Widrow | G06F 17/30247 382/155 |
| 7,805,386 | B2 * | 9/2010 | Greer | G06N 3/04 382/158 |
| 8,037,010 | B2 * | 10/2011 | Jaros | G06N 3/08 706/15 |
| 8,041,651 | B2 * | 10/2011 | Greer | G06N 3/04 382/158 |
| 8,504,494 | B2 * | 8/2013 | Jaros | G06N 3/08 706/12 |
| 8,923,040 | B2 * | 12/2014 | Lin | G11C 11/1675 365/148 |
| 8,970,770 | B2 * | 3/2015 | Nanu | H04N 5/23219 348/345 |
| 9,373,038 | B2 * | 6/2016 | Richert | G06N 3/08 |
| 9,489,618 | B2 * | 11/2016 | Roy | G11C 11/16 |
| 2004/0039717 | A1 * | 2/2004 | Nugent | B82Y 10/00 706/27 |
| 2006/0123280 | A1 * | 6/2006 | Tran | G11C 11/5621 714/718 |
| 2006/0133699 | A1 * | 6/2006 | Widrow | G06F 17/30247 382/305 |
| 2008/0152217 | A1 * | 6/2008 | Greer | G06K 9/6248 382/155 |
| 2008/0208783 | A1 * | 8/2008 | Jaros | G06N 3/049 706/21 |
| 2009/0006289 | A1 * | 1/2009 | Jaros | G06N 3/049 706/12 |
| 2009/0299929 | A1 * | 12/2009 | Kozma | G06N 3/0454 706/25 |
| 2010/0238700 | A1 * | 9/2010 | Li | G11C 11/16 365/148 |
| 2010/0241601 | A1 * | 9/2010 | Carson | G06N 3/02 706/27 |
| 2010/0316283 | A1 * | 12/2010 | Greer | G06K 9/6248 382/155 |
| 2012/0005134 | A1 * | 1/2012 | Jaros | G06N 3/049 706/12 |
| 2013/0132314 | A1 * | 5/2013 | Snider | G06N 3/063 706/15 |
| 2013/0285739 | A1 * | 10/2013 | Blaquiere | G01R 31/31855 327/565 |
| 2014/0028347 | A1 * | 1/2014 | Robinett | G11C 13/0007 326/38 |
| 2015/0242690 | A1 * | 8/2015 | Richert | G06N 3/08 382/103 |
| 2015/0347896 | A1 * | 12/2015 | Roy | G11C 11/16 365/148 |

* cited by examiner

Figure 1 JPAT: a Joint Proximity Association Template

JOINT PROXIMITY ASSOCIATION TEMPLATE FOR NEURAL NETWORKS

TECHNICAL FIELD

The Joint Proximity Association Template (JPAT) for neural networks invention has an obvious application to neural network based algorithms in areas such as Computer Vision and Speech Processing. It is envisioned that it will also apply to other hierarchical systems that (1) classify human behavioral performance via EKGs, EEGs, and EOGs, (2) classify large clusters of data sets, i.e. Big Data, (3) carry out iterative hierarchical algorithms in the domain such as RF, Acoustics, and Geophysics and (4) monitor network traffic using Open System Interconnection (OSI) architecture.

BACKGROUND OF THE INVENTION

The computer implemented Joint Proximity Association Template (JPAT) neural network for implementing a bi-directional neural network framework invention that is to be described in this patent is constructed from a combination of two distinct types of machine learning methods; a convolutional neural network and an associative memory matrix. By recognizing that a neural network is a logic based device and by interpreting associative memory as an intuitive based device, this invention can be said to emulate the intra-action and the inter-action of the cognitive processes of the left-brain and right brain. The invention is a computer processing soft-ware based implementation that (1) reduces the long training times by a full order of magnitude, (2) reduces the execution time to reach a decision by a full order of magnitude, and (3) produces beneficial intralayer and inter-layer connections.

The implementation of this computer implemented joint processing architecture is designed to take an existing hierarchy of proximal layers of feed-forward convolutional neural network processes, add next to it a parallel hierarchy of proximal associative memory processes, and then furthermore, connect the two processes by another set of associative memory processes. FIG. 1 gives the visual outline for the joint processing architecture which has the appearance of a ladder. The part of the figure that is enclosed by the dash-lined box indicates the main part of the invention. This invention It is the purpose of this paper to describe how the device was built and how it can be implemented as a machine learning enhancement tool that may be used to replace or complement any existing convolutional neural networks programmed for image classification.

The present technical solution can be a computer program method, a system, or a product at any technical detail of integration. The computer program product may include a non-volatile material-based computer readable storage medium having computer readable instructions therein for invoking a processor to carry instructions of the present technical solution in response to an instruction execution device.

Several references are given at the end of this paper in the form of patents and published papers. These references are (roughly) split into two groups; one group for neural networks (NN) and one group for associative memory (AM). There is a third group called Both.

A diagram for a basic neural network (NN) is given in FIG. 2. There is an input U, two sets of weights and biases and an output Y. The weights and biases weave the input to the output. Two equations are given that show the updating process as the process iterates. The equation for Y is shown and serves to produce a number. This number is compared to a desired number; usually in the form of a classification vector. In general there are several inputs matched with several desired outputs. The error curve tracks the trajectory towards an acceptable error threshold. There is no deterministic approach to get to the threshold immediately; it 'just happens' with the aid of Paul Werbos and his insightful thesis whose subject was the application of backpropagation to artificial NNs. The point of FIG. 2 is to show that in order to get from Layer U to Layer Y a set of weights are trained in order to carry out that task. The purpose of the weights is to add a greater capacity for correlation over that of simply comparing U to Y. The idea of adding layers between U and Y is rooted in the desire to emulate human cognitive processes. A diagram for a basic associative memory (AM) matrix is given is FIG. 3. The diagram shows an example with two input/output (I/O) pairs A1/B1 and A2/B2. These two pairs start out in binary form but are transformed into polar form into the corresponding pairs X1/Y1 and X2/Y2. An AMM is formed by summing the outer products of the two polar pairs. The matrix M is given on the right. This matrix takes the place of the weights and biases of FIG. 2. The only training, so to speak, is the forming of the outer products. The idea is to apply A1, or a noisy version thereof, to the matrix M whereupon the strong association embedded within M would draw the output to B1. The term Bidirectional Associative Matrix (BAM) comes from the fact that this output can in turn be applied to the transpose of M whereupon the new output should approximate A1. The back-and-forth process can be repeated until a so-called resonate pair forms.

In general the idea of forming associations between I/O pairs is well founded; only the way in which the M matrix is formed has issues with stability which has led to other approaches such as the Adaline method of Bernard Widrow and Ted Hoff. The point of FIG. 3 is to show that the I/O pairs themselves form the AM connection matrix in contrast to the derived weights and biases of the NN.

The NN process is used to demonstrate a necessary component of the overall process and make-up of J. Patrick's Ladder. In essence, the NN is only an auxiliary part of the invention which is the reason the dash-line box in FIG. 1 does not include the NN. Rather, the main part of the invention is the novel two-fold implementation of the AM construct in the way of a parallel (to the NN) process that may be described as demonstrating an intuitive sense that facilitates (1) faster learning, (2) faster execution, and (3) intra-layer information sharing.

For the remainder of this paper and in order to provide a clear example of what this invention is capable of doing, the number of I/O object pairs learning will be set to ten throughout this paper.

The specific neural network to be used for demonstration is the convolutional neural network (CNN) and the specific type of associate memory will follow the additive model which will be referred to as the Associative Memory Matrix (AMM). Note that another common name for AMM is Bidirectional Associative Memory (BAM). This paper will use AMM.

A generic outline of a computer implemented CNN process stored in memory is given in this background section as opposed to giving it in the summary of invention section. The outline below is the process step filler to the left rail of FIG. 1. The CNN processes are unidirectional processes which are indicated by the pairs of downward pointing arrows along the left rail.

For this Generic CNN Process outline, 21 steps are listed. In each step a computer is used to execute pre-programmed instructions that transform an input image throughout multiple stages and that stores numerical outputs of computer implemented transforms in memory used by a computer to classify the input image. We want to emphasize that the following steps only form a generic outline of a typical convolutional neural network with its typical functions of, and not limited to, downsampling, biasing, and application of an activation function (tan hn). The point of this part of the description is to show the context of the layering in any general convolutional neural network in order to direct the comparison between layers of the CNN and associative memory matrices in the JPAT; however, the instructions in the JPAT description under the SUMMARY OF THE INVENTION are detailed.

Given Layer 1
  1. The initial input Object/Image is a 28×28 matrix of numbers called L1

Compute Layer 2 with the following process (labeled P12)
  2. Apply 2D Convolution of L1 with twelve 15×15 filters
  3. Apply Tan h
  4. Downsample by four
  5. Multiply by weights
  6. Add biases
  7. Tan h compress Layer 2 output consists of twelve 14×14 images and is called L2

Compute Layer 3 with the following process (labeled P23)
  8. Apply 2D Convolution of L2 with select sets of 5×5 filters
  9. Apply Tan h
  10. Downsample by four
  11. Multiply by weights
  12. Add biases
  13. Tan h compress Layer 3 output consists of sixteen 5×5 images and is called L3

Compute Layer 4 with the following process (labeled P34)
  14. Apply 2D Convolution of L3 with select sets of 5×5 filters
  15. Apply Tan h
  16. Output one hundred twenty 1×1 images Layer 4 output is a 120×1 vector and is called L4

Compute Layer 5 with the following process (labeled P45)
  17. Multiply L4 output with weight matrix
  18. Apply Tan h Layer 5 output is a 200×1 vector and is called L5

Compute Layer 6 with the following process (labeled P56)
  19. Multiply L5 output with weight matrix
  20. Apply Tan h Layer 6 output is a 10×1 vector and is called L6
  21. From L6 output, the classification decision is based on the position of maximum value This concludes the background to this invention. The invention will show how the CNN and the AMM processes are brought into a dependent relationship; one that appears to be very beneficial. Although the immediate application is to pattern recognition with respect to the MNIST data base of handwritten numeral 0-9, it is envisioned that it will also apply to other hierarchical systems that (1) classify human behavioral performance via EKGs, EEGs, and EOGs, (2) classify large clusters of data sets, i.e. Big Data, (3) carry out iterative hierarchical algorithms in the domain such as RF, Acoustics, and Geophysics and (4) monitor network traffic using Open System Interconnection (OSI) architecture. In short, it is envisioned that the JPAT construct will apply to any hierarchical and logic based machine learning class process.

SUMMARY OF THE INVENTION

This part of the patent will summarize the two main components to the invention of J the Joint Proximity Association Template (JPAT). The JPAT is a software based hierarchical architecture of two rails and a set of rungs. The left rail is a software based CNN process; like the one given in [OL1]. The right rail is a software based AMM process shown below in [OL2]. The rungs are a software based series of connectors between a CNN output and an AMM output at the same layer in the hierarchy. The emphasis of this summary is on implementing an AMM rail in parallel to a CNN and to show how an AMM can be implemented as an intra-layer connector to a CNN system. In contrast to the CNN processes outlined above, these AMM processes are a core part of the invention. As already stated, the AMM process depends on a trained CNN process. The formation of the AMMs is to be given in the details section of this paper. The AMMs for both the rail and the rungs are bidirectional. This fact is indicated by the pairs of arrows pointing in opposite directions both along the right rail and along the rungs. There are three outlines given below. The first outline may be associated with the right rail of FIG. 1. is the sole basis for this invention and it is from this outline that our claims are drawn. The second outline describes how to calculate a single layer AMM from the set of AMMs calculated in the first outline. The third outline describes the intra-layer (IL) connections via the rungs of the ladder. These last two outlines are simple applications of the first outline and are meant as lagniappe to those people skilled in the art of artificial neural networks and who interested in achieving the well-known Universal Approximation Theorem and/or are interested in creating a more cognitive-like neural network configuration that allows for inter-network layer interaction.

[OL2] for the AMM Process Outline Parallel to the CNN, 7 Steps are Listed (Long Version)

Given the same 28×28 matrix in L1 from the CNN process
  1. The matrix is reshaped into a single 784×1 vector and is called V1

Compute Layer 2 output
  2. Multiply V1 by the M12 matrix to be described in the details section Layer 2 output is a 2352×1 vector and is called V2

Compute Layer 3 output
  3. Multiply V2 by the M23 matrix to be described in the details section Layer 3 output is a 400×1 vector and is called V3

Compute Layer 4 output
  4. Multiply V3 by the M34 matrix to be described in the details section Layer 4 output is a 120×1 vector and is called V4

Compute Layer 5 output
  5. Multiply V 4 by the M45 matrix to be described in the details section Layer 5 output is a 200×1 vector and is called V5

Compute Layer 6 output
  6. Multiply V5 by the M56 matrix to be described in the details section Layer 6 output is a 10×1 vector and is called V6
  7. From Layer 6 output, the classification is based on the position of maximum value

[OL3] for the AMM Process Outline Parallel to the CNN, 3 Steps are Listed (Short Version)

Given the Layer 1 28×28 matrix called L1 from the CNN process
1. The matrix is reshaped into a single 784×1 vector and is called V1

Compute a matrix linking Layer 1 to Layer 6
2. Let M16=M12*M23*M34*M45*M56

Compute Layer 6 (directly from Layer 1)
3. Multiply Layer 1 vector by the M16 matrix Layer 6 output is a 10×1 vector and is called V6
4. From Layer 6 output, the classification is based on the position of maximum value

[OL4]. For the AMM Process as a Series of Intra-Layer Matrices (ILM) Connecting the Two Rails.

The IL processors are bidirectional AM matrices that connect the relative layer positions of the left CNN rail to the right AMM rail, i.e., the ILM processors are the rungs to the ladder. A layer output on one rail can move horizontally to a corresponding layer output on the other rail. The ILMs are given as:

ILM22, the bidirectional connector for L2 of the CNN to V2 of the AMM

ILM33, the bidirectional connector for L3 of the CNN to V3 of the AMM

ILM44, the bidirectional connector for L4 of the CNN to V4 of the AMM

ILM55, the bidirectional connector for L5 of the CNN to V5 of the AMM

ILM66, the bidirectional connector for L6 of the CNN to V6 of the AMM

Note: There is no need for ILM11 since L1 and L2 contain the same data.

DETAILED DESCRIPTION

Figure 1:
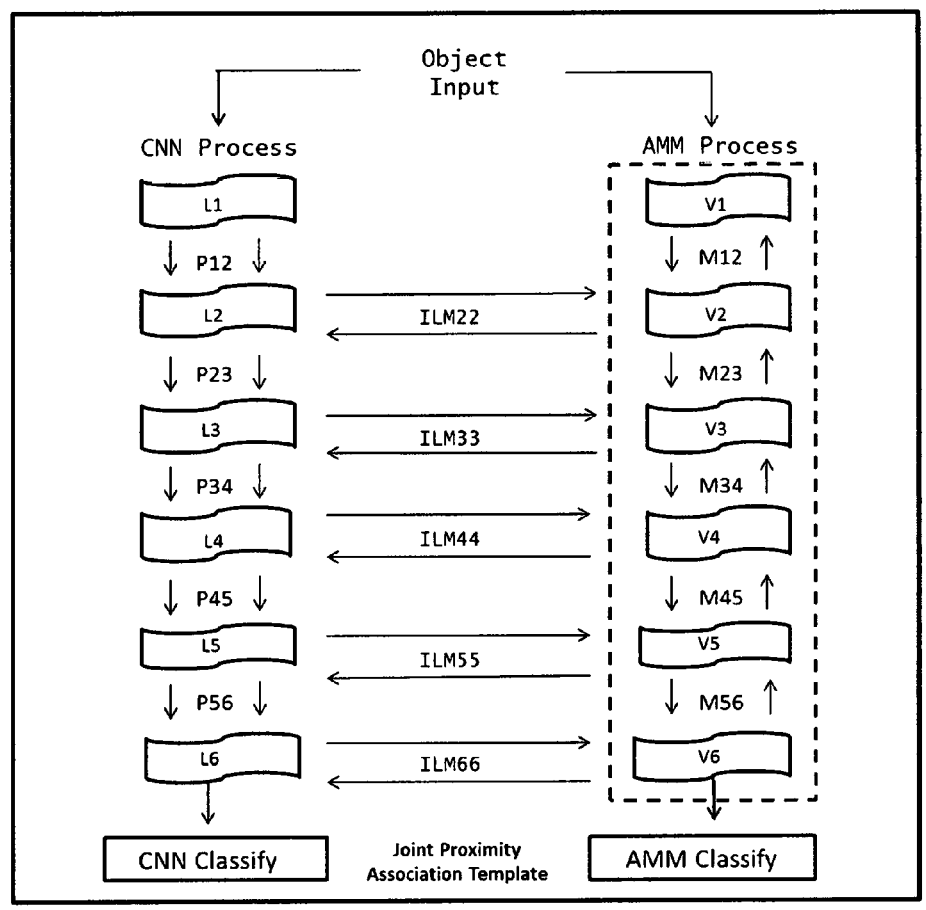
FIG. 1—A Joint Proximity Association Template (JPAT). It shows the left rail as the feed-forward convolutional neural network (CNN) process and the right rail as the bidirectional associative memory matrix (AMM) process. The rungs between the rails form the intra-layer (IL) connections. The CNN can be replaced with one or more AMMs to better represent how the cognitive process works.

This section will describe the details for forming the AMMs which, as has been stated before, are dependent on the CNN processes. The description is broken into two parts. Part 1 describes the process of initialization of the AMMs using the CNN output layers. Part 2 describes the execution of the system and test results are given as well. All actions described herein are executed automatically through stored computer instructions; all input images, output vectors, and matrices are stored in memory and then are called from memory as needed to execute the image classification programs.

Part 1 is broken into four sub-parts, 1A-1D. These four sub-parts show: (Part 1A) how the V1-V6 vectors are initially formed, (Part 1B) how the initial M12-M56, and M16 matrices are formed, (Part 1C) how the initial matrices are combined to form the so-called additive model; a term coined by Stephen Grossberg and John Hopfield, and (Part 1D) how the additive matrices are stabilized. These are the matrices that form the right rail. It is important to note that Parts 1A-1C are strictly for initialization of the matrices in Part 1D. Once the initialization is complete and the execution of the testing process begins, the vectors V2-V5 can be solely derived from the AMM process and not from the CNN process.

Note that while V1 and L1 are always the same numerically, the vectors L2 and V2, L3 and V3, L4 and V4, L5 and V5, and L6 and V6 are not the same.

The purpose of Part 2 is to tie all the ideas promoted in the paper thus far into a fluid operational implementation of the invention. Some processing results are given as well.

Part 1 Training the System

[OL5] Part 1A: This is how to Transform the CNN Layers into AMM Vectors in FIG. 2
1. From Layer 1 reshape the 28×28 Object Image L1 into a 784×1 vector forming the initial V1
2. From Layer 2 first reshape each of the twelve 14×14 images of L2 into twelve 196×1 vectors, then concatenate the twelve vectors into a single 2352×1 vector forming the initial V2
3. From Layer 3 first reshape each of the sixteen 5×5 images of L3 into sixteen 25×1 vectors, then, concatenate the sixteen vectors into a single 400×1 vector forming the initial V3
4. From Layer 4, keep the 120×1 vector of L4, as is forming the initial V4
5. From Layer 5, keep the 200×1 vector of L5 as is forming the initial V5
6. From Layer 6, keep the 10×1 vector of L6 as is forming the initial V6

[OL6] Part 1B: Forming the Basic AMM

From the six vectors V1-V6 representing the six output layers of the AMM process, five initial AMMs are to be formed. The dimensions of the matrices are not part of this claim, but are guidelines for producing a system capacity to discriminate between objects during operation. Let:

$M12 = V1 \times V2^T$, dimension 784×2352

$M23 = V2 \times V3^T$, dimension 2352×400

$M34=V3 \times V4^T$, dimension 400×120

$M45=V4 \times V5^T$, dimension 120×200

$M56=V5 \times V6^T$, dimension 200×10

$M16=M12*M23*M34*M45*M56$, dimension 784×10

[OL7] Part 1C: Forming the Additive Model Matrix

Parts 1A and 1B show how to initialize the vectors and the AMMs, for an initial image/object. However, there are 10 distinct objects for this example, so there must be formed 10 distinct vectors for each layer which in turn leads to 10 associative memory matrices for each layer. Thus for the 10 objects to be classified, let $M12(i)=V1(i) \times V2(i)^T$ for i=1:10. Then these 10 matrices are 'added' together to form the additive model matrix rewriting M12 as:

$M12=M12(1)+M12(2)+M12(3)+M12(4)+M12(5)+M12(6)+M12(7)+M12(8)+M12(9)+M12(10)$

Likewise, this is done for rewriting M23, M34, M45, and M56:

$M23=M23(1)+M23(2)+M23(3)+M23(4)+M23(5)+M23(6)+M23(7)+M23(8)+M23(9)+M23(10)$ $M34=M34(1)+M34(2)+M34(3)+M34(4)+M34(5)+M34(6)+M34(7)+M34(8)+M34(9)+M34(10)$ $M45=M45(1)+M45(2)+M45(3)+M45(4)+M45(5)+M45(6)+M45(7)+M45(8)+M45(9)+M45(10)$ $M56=M56(1)+M56(2)+M56(3)+M56(4)+M56(5)+M56(6)+M56(7)+M56(8)+M56(9)+M56(10)$

[OL8] Part 1D: Stabilize the Additive Matrices

This invention will not work with the AMMs just derived through Parts 1A-1C. Stabilizing the matrices is a subtle but very important part to the implementation of the ladder. The additive matrices need to be stabilized for the AMM process to work effectively and consistently. A research paper written by Acevedo-Mosqueda et al. gives a comprehensive accounting of past practices. Some approaches utilize a function of the Adaline method and some others utilize a thresholding procedure upon the basic AMM. While many of these approaches will fulfill the requirement for stabilization, a different approach, one that is not found in the literature, is an approach that leverages the Singular Value Decomposition (SVD) and the so-called 'whitening' step from an Independent Component Analysis (ICA) algorithm. (See LaRue et al.).

The stabilization algorithm follows these basic steps:
1. Take the M12 additive matrix.
2. Produce its Singular Value Decomposition components U, S, and V such that $M12=U*S*V^T$.
3. Reset the all of the Singular Values to one; effectively treating the singular vectors as equals.
4. Reform M12 with 10 vectors each from U and V: $M12=U(:,1:10)*V(:,1:10)^T$
5. Repeat (1-4) for M23, M34, M45, and M56.

The Singular Values are omitted, or equivalently the singular values have been set to the value of 1; essentially whitened as the ICA algorithm would suggest. The operation to reform the additive matrices in this way can be interpreted as an operation that focuses on the character of each of the 10 pairs of principal vector components without their corresponding singular values in contrast to the power of the 10 pairs of principal components with their corresponding 10 singular values.

Resonance is a key concept to forming the associative memory matrices. Each additive matrix is made of 10 independent sub-component matrices and thus each of the five additive matrices has a rank of 10. However, since the component matrices are not, in general, orthogonal, the mixing process tends to produce a few dominant singular values among the 10 significant singular values generated. This dominance is passed on to the mixture in a subtle way. Only by analyzing the corresponding singular vectors can one foresee which objects will most likely resonate no matter which object is presented to the system. This type of resonance is sometimes called an 'unintended attractor'. Further details are given in Part 2.

Note 1: By setting all the singular values to one, it allows the number of vectors in step 4 of [OL8] to exceed 10. An analysis of the so-called 'null-space' vectors will indicate viable candidates. A viable collection to use may consist of 20 vectors each from U and V.

Note 2: The literature offers an analysis in terms of Eigenvector decomposition (EVD) which is sometimes associated with the SVD. However, if the matrices are rectangular and not square, the EVD is not possible to use. And, if the matrices are square, but not symmetric, then the EVD can lead to a characteristic polynomial whose roots may be comprised of real and complex numbers. This fact makes rank assessment more difficult than when using the SVD. In addition the eigenvectors are not necessarily orthogonal like those vectors from the SVD. However, there are notable applications of the EVD as developed by John Anderson.

Adding Details to Parts 1A-1D

The Details for Part 1A

Part 1 showed how to implement the initialization of the AMMs with one set of 10 objects. The AMM first requires input from the CNN. Hence, there is a relationship between the logical processes of the CNN and the association processes of the AMM. In practice, the vectors that are described in Part 1A rely on CNN training with more than a single set of objects. Usually, the CNN is programmed to stop either after a certain number of training iterations or upon attaining a predetermined threshold.

An epoch is defined as a set of iterations where an individual iteration is identified with one of the objects to be classified. For the example in this paper, that would mean 10 iterations form an epoch since there are 10 objects to be classified. In particular, for this example, we have 10 object classes of handwritten numerals (0-9) from the MNIST data set. Thus 200 iterations means that 20 examples each of the 10 numerals 0-9 were passed through the CNN process or, that there were 20 epochs of the 10 different classes of objects passed through the CNN process. Thus there are 200 objects total used for training.

The purpose of the training process is to favorably adapt the weighting matrices and biases associated with the CNN training process. The adaptation is carried out through backpropagation. At the end of the 200 iterations the weights, biases, and other parameters are stored in memory. Note: While in training, the ordering of the objects for each epoch is based on pseudo uniform random number generator, as is common practice.

Once the weights and parameters are stored in memory, the CNN is placed into testing mode. This is when the CNN classifies objects without any further backpropagation or parameter adjustments. The CNN process outline [OL1] is described in testing mode. To acquire the vectors for the AMM processor, the same 200 objects are passed through the CNN processor. At each of the CNN layers the output is reshaped, if necessary, into vectors as described in the AMM processing outline [OL2]. The vectors are partitioned into separate classes by matching the input object with the appropriate classes of numerals 0-9. Thus, there are 10 classes of vectors in which each class contains 20 homogeneous output vectors.

A technique utilized in this implementation is to average the vectors in each class to one vector. For example, in Layer 4 of the AMM process, the stated dimension of the vector is 120×1. In the context of what we have described so far, after running the 200 iterations, 200 120×1 vectors would have been collected. These vectors are partitioned into 10 distinct sets according to the 10 distinct classes of MNIST numerals. The 20 members of a class are arranged into a 120×20 matrix. This matrix is averaged across the rows forming a 120×1 vector. This is done for each class. And, this is done at each of the six CNN layers. Thus at each AMM layer there are 10 vectors accounted for corresponding to a single average of each of the 10 class outputs.

The Details for Parts 1B and 1C

Any AMM is formed by taking an outer product of vectors. In this section the vectors are those derived above in the details for Part 1A. This approach is credited to Bart Kosko.

In part 1B the first AMM is shown as $M12=V1\times V2^T$. $M12$ has dimension 784×2352. M12 refers to an associative memory matrix formed from the Layer 1 and Layer 2 vectors, V1 and V2; again, as derived in Part 1A. But for each layer there are 10 representative vectors. In particular, for this example, M12(1) refers to the outer product between the averaged vector output in Layer 1, in this case a numeral '0' in vector format, and the averaged vector output in Layer 2 in response to the '0' passing through P12. Hence, M12(1) refers to the 784×1 V1 vector associated with the numeral '0' multiplied by the transpose of the 2352×1 V2 vector obtained through the CNN process. In like fashion, M12(2)-M12(10) correspond to the outer products associated with P12 acting on the remaining numerals 1-9.

In Part 1C, M12 is reformed using Kosko's additive matrix approach be derived from conversations with Stephen Grossberg and other resources including Hopfield and Kohonen. By adding the ten M12 sub-components we get:

$$M12=M12(1)+M12(2)+M12(3)+M12(4)+M12(5)+M12(6)+M12(7)+M12(8)+M12(9)+M12(10).$$

And, in like fashion, M23, M34, M45, and M56 are formed.

The Details for Parts 1D

Inherent to the Kosko formulation of the additive model memory matrices is the issue of stability. The AMM process outline infers that a vector from one layer is passed through an associative memory matrix to form a vector in the next layer whereupon this output vector is now the input to the next associative memory matrix which produces a vector in the next layer. The problem is, and has been for over 30 years, these matrices and their transformations of input vectors are not stable. The structure of the additive matrix has a negative effect on the transformations which in turn yields nonsensical results, in some cases. Many techniques have been designed to mitigate this problem and among those are offshoots of the basic Adeline recursion technique.

Another approach to stabilizing the matrices is based on a novel implementation of Independent Component Analysis. In [OL8] Part 1D the approach includes applying the SVD to an AMM from Part 1C, setting the singular values to one, forming a new AMM with only 10 vectors each from the U and V matrices, and repeat the process for the remaining AMMs.

The reason to keep 10 each is because the rank of the AMM matrix is 10; a result of adding the 10 outer product matrices. There are suggestions to using the Eigenvector decomposition but caution should be used because in some cases the eigenvectors and eigenvalues are complex valued and may lead to confusion to interpreting rank. In contrast, the SVD leaves little to be confused about. In addition, there are physical differences in eigenvectors and singular vectors in that the singular vectors are designed to be orthogonal whereas the eigenvectors are designed to point in directions of greatest response to the matrix which may not yield orthogonal vectors. In any event, the matrices in the example are not square, let alone, symmetric, and cannot be used at all. However, both the Adeline and Eigenvector approaches have been tested with square but non-symmetric matrices and each method works nearly as well as the SVD/ICA implementation.

Parts 1A-1D in Review:

The action on the ladder starts with the CNN training process. It has a unidirectional hierarchy and has many layers. Various classes of objects are given as inputs to the process. Each class of objects behave similarly as they pass through the CNN process. At first, the CNN is trained using these objects. Then, after a prescribed limit, the training is stopped. Then, once again, the objects are passed through the CNN processor but this time the outputs are stored as vectors in order to form the AMM rail. The stored vectors are averaged within their respective classes to form a single representative for each class and for each layer.

For example, take the class of objects for the numeral '0'. We take 20 examples of the numeral '0' from the MNIST data base. Each example numeral starts at the L1 layer. The average of the 20 inputs is kept as the class representative for the numeral '0' at the V1 layer of the AMM. Then, each of the 20 inputs is passed through the set of CNN processes connecting L1 to L2. This collection of 20 vectors at the L2 level is averaged into a class representative of '0' at the V2 layer of the AMM. In like fashion a '0' representative is found for the remaining layers V3-V6 by leveraging the information derived in L3-L6. Thus there are six representatives in all for the numeral '0'. The first AMM for '0' connecting V1 to V2 is called M12(1), and is formed by taking the outer product of V1 and V2. Then, the second AMM for '0' connecting V2 to V3 is called M23(1), and is formed by taking the outer product of V1 and V2. In like fashion we form the remaining connection matrices for '0', namely M34(1), M45(1), and M56(1). There are five connection matrices in all for the numeral '0'. This procedure is repeated for the remaining nine numerals. Thus from a total of 50 matrices, the five additive matrices M12, M23, M34, M45, and M56 are formed as shown in Part 1C.

These five additive matrices are inherently unstable and thus are stabilized using the SVD and the ICA method as shown in Part 1D. They replace and are named the same as the original additive matrices M12, M23, M34, M45, and M56 for sake of brevity.

Connecting the Two Rails with Intra-Layer Matrices

The purpose of Parts 1A-1D was to show how to form the AMM rail. The product is the set of five matrices M12-M56. These five matrices are an estimation of the five processes P12-P56, an existing product of the CNN rail. The construction of the ladder requires a set of intra-layer matrices to act as rungs to connect the finished rails together.

Figure 4:
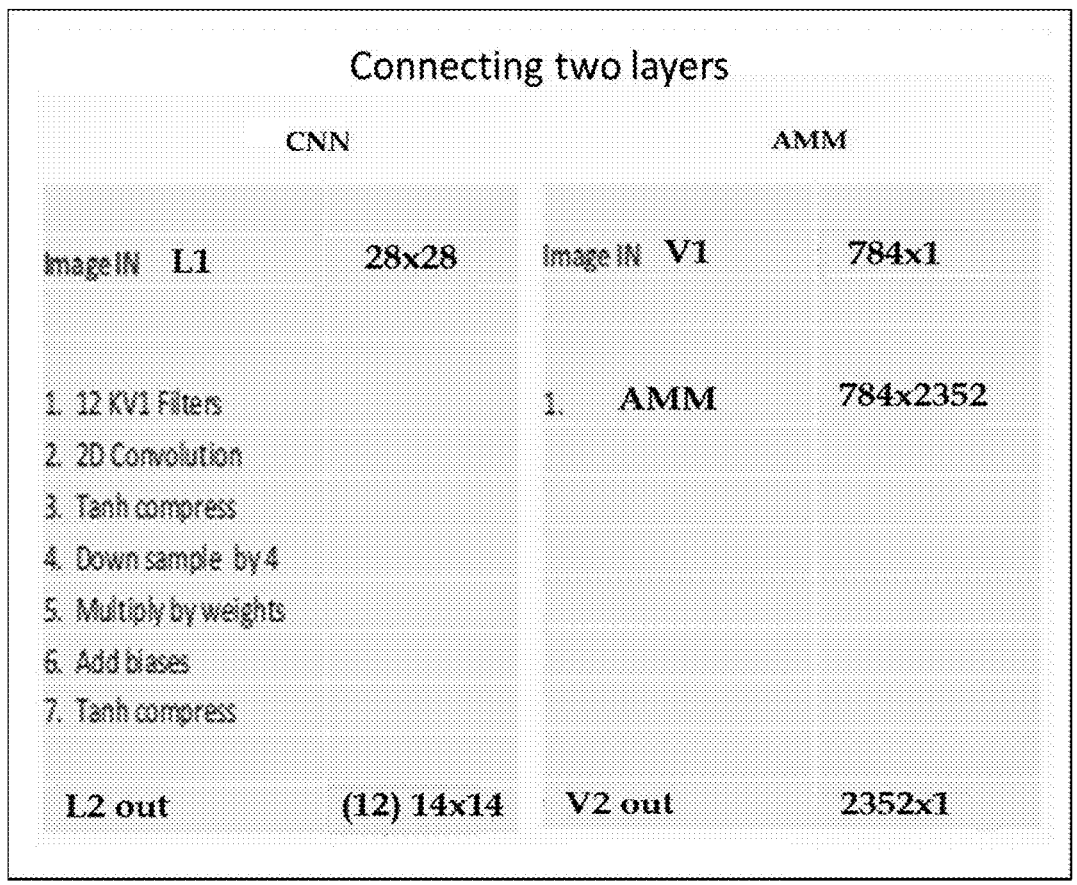
FIG. 4—A detailed look at both processes connecting Layer 1 to Layer 2 to emphasize the logical steps of the CNN in contrast to the single association step of the AMM.

It is important to stop and point out that for a given object the CNN layer outputs and the AMM layer outputs are different; they are related; they both give information to the same layer number; but their outputs are calculated in a fundamentally different fashion. This is due to the realization that while the AMM system is dependent on the CNN system, the AMM is not a copycat of the CNN. Indeed, looking back at FIG. 4, while the CNN necessarily steps through a series of seven logical processes, the AMM uses a single matrix to circumvent the process with a one-step association.

Figure 2:
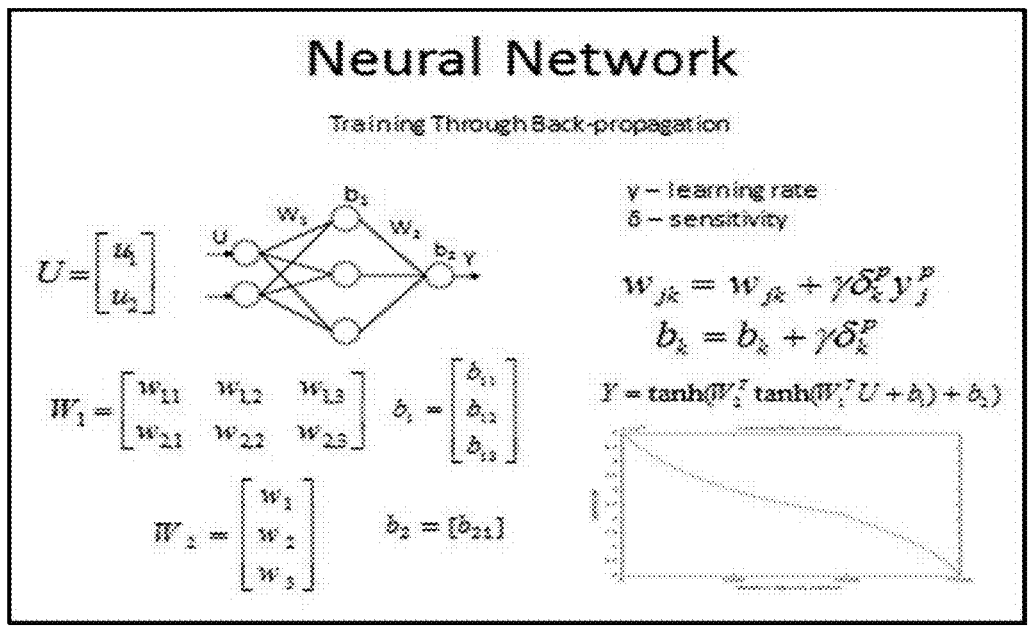
FIG. 2—Shows how a basic neural network (NN) is drawn along with the weights and biases that connect one layer to the next, the update formulas, an output formula where the hyperbolic tangent function is used to limit the output, and an error curve.
Figure 3:
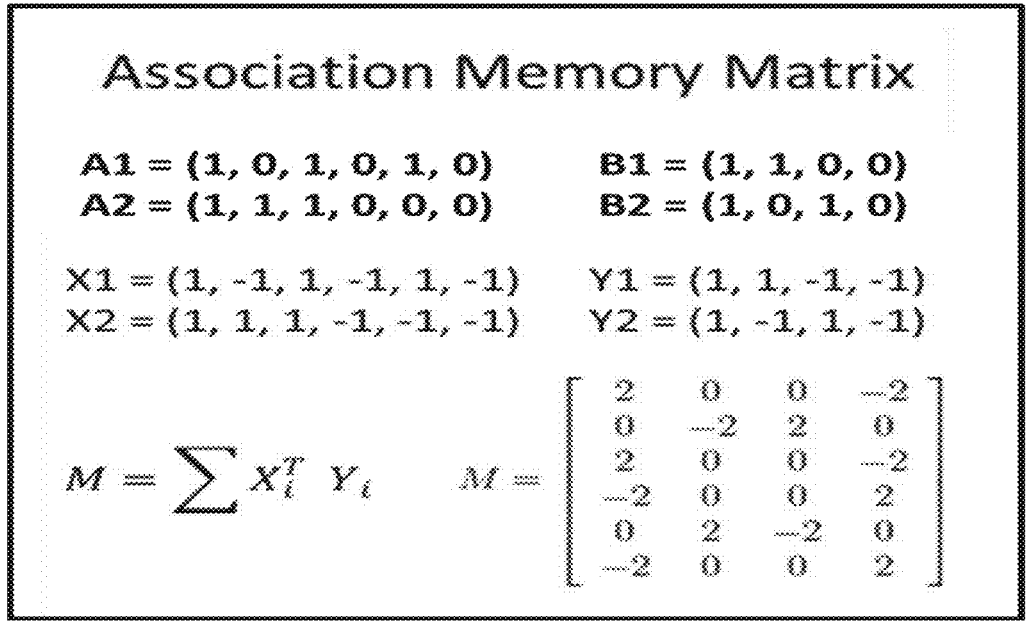
FIG. 3—How the basic associative memory matrix (AMM) is constructed from two sets of input/output pairs X1/Y1 and X2/Y2.

To build the rungs as shown in FIG. 1, pairs of vectors from L2 and V2, L3 and V3, L4 and V4, L5 and V5, and L6 and V6 are required. In this case a set of objects is passed through the two rails where the L and V vectors are arrived at completely independently, for the first time; basically it is almost testing mode. By following Parts 1A-1D, the ILMs listed in [OL4] are derived. Thus the CNN rail with its five sets of logical stepping processes and the AMM rail with its five sets of intuitive association processes are connected with five ILM rungs to form the JPAT ladder. The system is now ready to execute testing.

The descriptions of the various components of the present technical solution have been presented for purposes of illustration only and are not intended to be exhaustive or limited to the components described. Implementing modifications and variations will be apparent to those of ordinary skill in the art convolutional neural networks and bidirectional associative memory matrices without departing from the scope and spirit of the described components. The terminology used herein was chosen to best explain the general principles of the system components, the practical application, or technical improvement over convolutional neural network and bi-directional associative memory matrix technologies found in the marketplace, or to enable others of ordinary skill in the art to understand the embodiment of the system components described herein.

Part 2

Test and Evaluation of JPAT

Up to now the detailed description in Part 1 has focused on how to set up an AMM rail and a set of rungs given a CNN rail. Also, up to now, the AMM has been dependent on first training the CNN for forming the vectors that in turn form the AMMs. Once the training is over the AMM rail becomes completely independent from the CNN. In fact, as will be noted later on, the CNN, in a turn of events, can become dependent on the AMM to improve its own results. Thus the CNN and AMM can develop a mutually beneficial relationship.

Part 2 gives several operational implementations of the invention shown in FIG. 1. Some scenarios are included to give results in the way of training time, execution time, and accuracy. Other scenarios will emphasize the usefulness of the intra-layer connectors.

Testing with the CNN

An object to be classified is presented to the CNN. The input is viewed as the L1 layer. The information in this layer is relayed to the L2 layer via the P12 process that connects Layer 1 to Layer 2. Then the information in layer two is processed via P23 to Layer 3 and so on down to layer L6. L6 is a 10×1 vector and its dimension corresponds to the number of distinct classes of objects. The CNN classifies the object from its L6 output using a maximum criterion.

Testing with the AMM (Long Version)

An object to be classified is presented to the AMM. The input is viewed as the V1 layer. The V1 vector is passed through the matrix M12 to produce the output vector V2. The AMM process continues by passing V2 through the next associative matrix, M23, to produce V3, and so on to V6. The AMM classifies the object from its V6 output using a maximum criterion.

Testing with the AMM (Short Version)

The CNN processes between the layers cannot be combined into one process step. On the other hand the AMM process can be reduced to one matrix by simply setting M16=M12*M23*M34*M45*M56 resulting in a 784×10 matrix. In other words, this single association matrix M16 can take the place of over 20 individual logic based processes. Hence, once the V1 vector is presented to M16, the V6 vector is produced in one step. The AMM classifies the object from its V6 output using a maximum criterion.

Note: The transitive property for matrices was invoked to form M16. Zhou and Quek also used the transitive property. The difference between this implementation and their implementation is that their implementation uses deterministic object patterns at every layer whereas JPAT only uses deterministic objects at the endpoints. The point is their implementation does not rely on a neural network framework such as the CNN; the two implementations are fundamentally different in this respect.

Evaluating the Test Execution Times of the CNN and the AMM.

Figure 5:
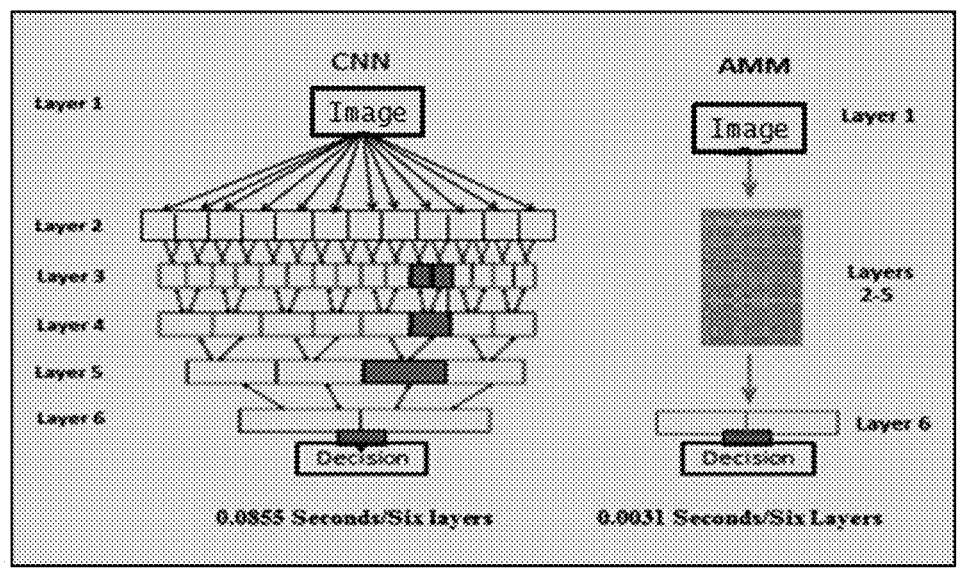
FIG. 5—A diagram to emphasize that while the CNN must go through all the layers in hierarchical fashion, the AMM process can be formed into one single matrix by multiplying the five matrices, M12-M56, in FIG. 1. Execution times are given. The ability to take a multilayer neural network and convert it into a single layer neural network is testament to its ability to compress or 'zip' multiple layer systems.

FIG. 5 provides a drawing that shows the CNN running through all six layers while the AMM compresses the matrices that connect Layer 1 to Layer 6, forming M16 as written in [OL6]. At the bottom of each system is the execution time it took to test an individual object presented at Layer 1 to both systems. The elapsed times are not important; the relative times are important. The AMM executed the decision 20× faster.

Evaluating the Accuracy of the CNN and of the AMM after 5000 Training Iterations.

Figure 6:
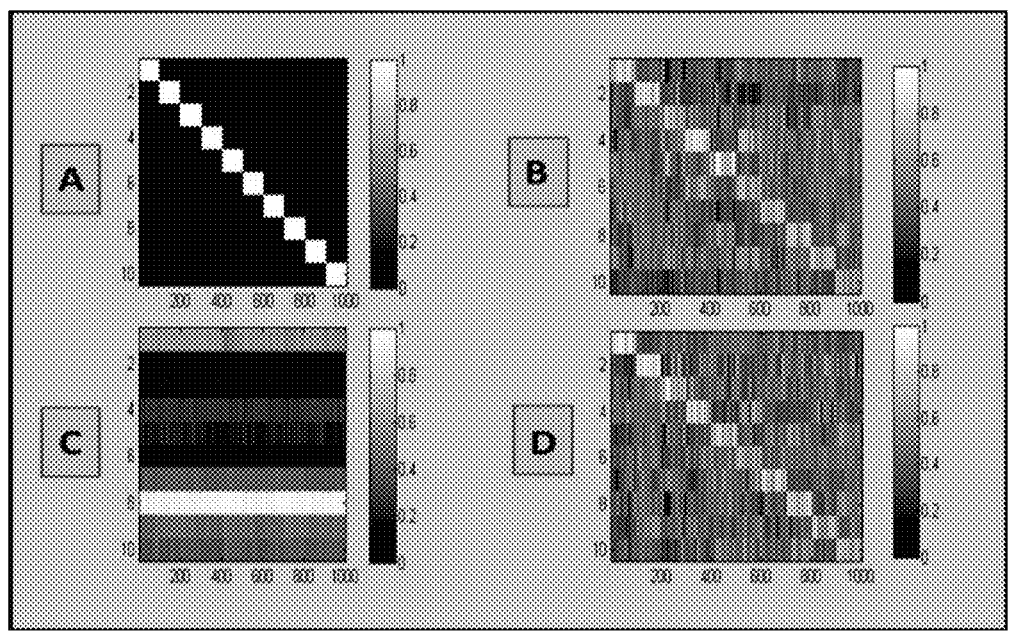
FIG. 6—A visual of 1000 decision vectors from: (A) an ideal system, (B) a CNN system, (C) a non-stable AMM system, and (D) a stable AMM system. The goal is to attain an ideal staircase appearance.

FIG. 6 gives a visual representation of the accuracy achieved after 5000 iterations. A test was administered that tested 100 members each of the ten MNIST classes. The test began with presenting one hundred 0's to the CNN and AMM systems. This was followed by presenting 100 1's to the systems and so on, ending with 100 9's to each system. For each test a 10×1 vector is computed. For the ideal case in computing the 10×1 vector for the numeral 0, the output vector would look like the transpose of [1 0 0 0 0 0 0 0 0 0], where the '1' in the first position indicates the decision is directed towards 0. The ideal output vector for the case when the numeral 1 is tested would be the transpose of [0 1 0 0 0 0 0 0 0 0]. The '1' in the second position indicates that the decision is towards the numeral 1. Thus in carrying out the ideal test over the 10 sets of 100 numerals each drawn from the same class, and presenting the results as vertical columns of a matrix, the result would appear as the staircase in FIG. 6A. The color-bar to the right of the figure indicates a range of values from 0 to 1. White indicates the strongest indicator of which numeral was being tested.

FIG. 6B visualizes the results for the CNN; the overall accuracy for the CNN was calculated to be approximately 80%.

FIG. 6C visualizes the results for the non-stabilized AMMs. The accuracy is exactly 10%; in this case row eight of the matrix is consistently the strongest indicator.

FIG. 6D, in stark contrast to FIG. 6C, visualizes the results for the stabilized AMMs. Its overall accuracy matches the accuracy of the CNN at approximately 80%.

For this test, although the results for the CNN and (stabilized) AMM are virtually the same there are two important notes to make: (1) The CNN took 85 seconds to execute the test of 1000 objects while the AMM only took 3 seconds to execute the test of 1000 objects and (2) As noted before the outputs on any corresponding layer between the CNN and the AMM are different. By combining the results visualized in FIGS. 6B and 6D, an improvement in accuracy can be made. Of course, if the AMM was substituted with another CNN-like process, for example the HMAX method by Riesenhuber & Poggio, improvements in accuracy would be also made.

Figure 7:
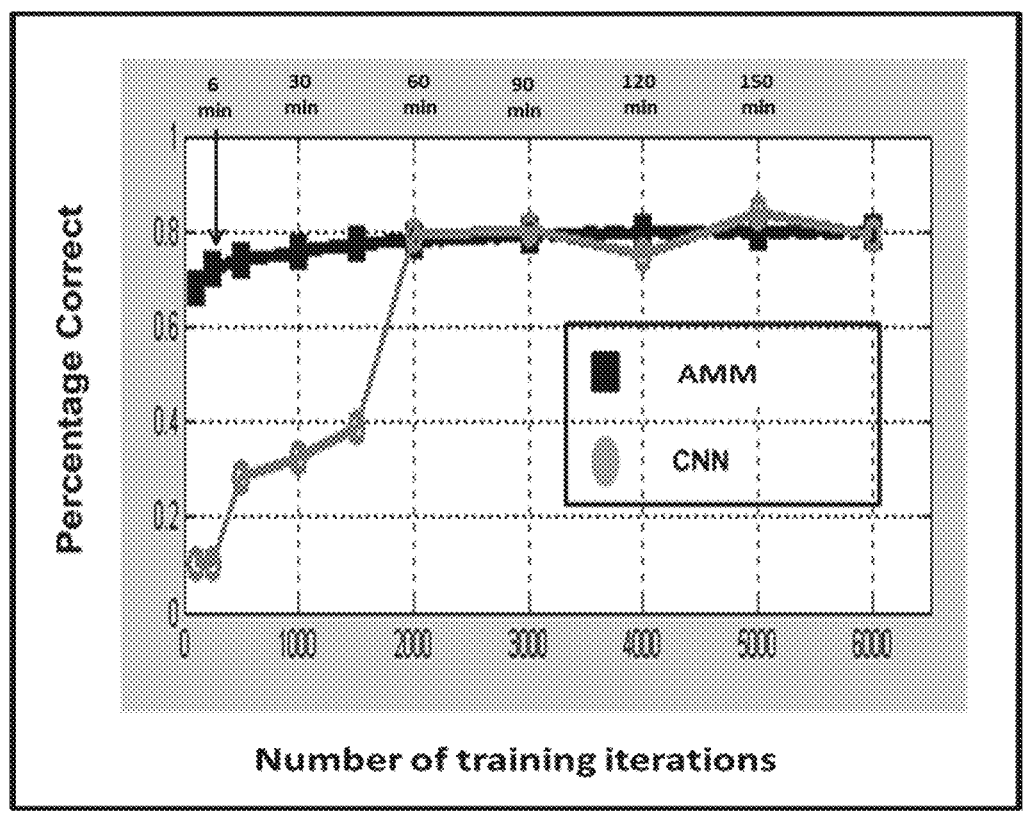
FIG. 7—The plots for the CNN and the AMM for the number of training iterations vs. the percentage correct. 1000 iterations take approximately 60 minutes of training time. The 6 minute marker indicates 200 iterations.

Evaluating the Accuracy of the CNN and of the AMM Over a Range of Training Iterations FIG. 7 indicates what is arguably the most important and immediate benefit from this invention. There is an asymptote at the 80% mark that both the CNN and AMM systems reach after 2000 iterations. However, the AMM reaches a 77% accuracy after only 200 iterations while the CNN is still at a 12% accuracy mark. Considering that the 77% is up against an 80% asymptote, this is equivalent to stating that the AMM returned 96% of what the best of the CNN or AMM can do overall. In terms of time, the CNN needs something on the order of 60 minutes of training to measure up to the AMMs result posted at 6 minutes.

Test and Evaluation of the Rungs: Improving the CNN with the Help of the AMM

At the 200 iteration or 6 minute mark the CNN accuracy posted a 12% accuracy while the AMM posted a 77% accuracy. Returning to FIG. 1, the rungs are those matrices ILM22 through ILM66 from OL4. When the information from V2 was passed to L2 through ILM22, and then the CNN executed the remaining steps along its own rail, the CNN accuracy rose to 14%. When the information from V5 was passed to L5 through ILM55, and then the CNN executed the remaining step through P56, the CNN accuracy rose to 37%. This indicates there may be an improvement in the way in which backpropagation in the CNN may be carried out in the future.

A Scenario for Utilizing the Full Potential of Joint Processing Architecture

Given an input to L1, the movement through the ladder could be:
L1-P12-L2-P23-L3-P34-L4-ILM44-V4-M42-V2-ILM22-L2-P23-L3-ILM33-V3-M36-V6
And make the decision.

DOCUMENTS CONSIDERED BEING RELEVANT

Neural Networks
U.S. PROVISIONAL PATENT APPLICATION, EFS ID 16351917 App No. 61847685 Confir No. 4039, Receipt Date 18 Jul. 2013 13:41:35, James and Denise LaRue.
U.S. Pat. No. 6,128,606 Oct. 3, 2000, Bengio et al.
U.S. Patent: US 2007/0047802 A1 Mar. 1, 2007, Siddhartha Puri
J. J. Hopfield, "Neural networks and physical systems with emergent collective computational abilities," Proc. Nat. Acad. Sci., vol. 79, pp. 2554-2558, 1982.
Cohen, M. A. and Grossberg, S, Absolute stability of global pattern formation and parallel memory storage by competitive neural networks, IEEE Transactions on Systems, Man, and Cybernetics, SMC-13, 815-826, 1983
Kohonen T., "Correlation matrix memories", IEEE Trans. Comput, vol. C-21, pp. 353-359, 1972.
Y. LeCun, Courant Institute, Corinna Cortes, Google Labs, New York, "The MNIST database of handwritten digits, http://yann.lecun.com/exdb/mnist
Widrow, B. and Lehr, M. A., 30 years of adaptive neural networks: Perceptron, adaline and backpropagation, Proc. IEEE 78, 9, 1415-1441, 1990.
Paul J. Werbos. Backpropagation through time: what it does and how to do it. Proceedings of the IEEE, Volume 78, Issue 10, 1550-1560, October 1990, doi10.1109/5.58337
Riesenhuber, M. & Poggio, T. (1999), Hierarchical Models of Object Recognition in Cortex, Nature Neuroscience 2: 1019-1025.
Jake Bouvrie, Notes on Convolutional Neural Networks, Center for Biological and Computational Learning, Department of Brain and Cognitive Sciences, Massachusetts Institute of Technology, Nov. 22, 2006.

Associative Memory Matrices
Bart Kosko, Neural Networks and Fuzzy Systems, A Dynamical Systems Approach to Machine Intelligence, Prentiss Hall, Englewood Cliffs, N.J. 07632, 1992.
R. W. Zhou and C. Quek, DCBAM: A discrete chainable bidirectional associative memory. Pattern Recogn. Lett. 17, 9, 1996, 985-999.
Chartier, S. and Boukadoum, 2006, A bidirectional heteroassociative memory for binary and grey-level patterns. IEEE Trans. Neural Netw., 2006, 17, 2, 385-396.
Acevedo-Mosqueda et al., Bidirectional Associative Memories: Different Approaches, ACM Computing Surveys, Vol. 45, No. 2, Article 18, February 2013.
James P. LaRue (Jadco Signals) and Yuriy Luzanov (AFRL-RIGC), Paper 8745-76: "Stabilizing bidirectional associative memory with principles in independent component analysis and null space", SPIE Defense, Security, and Sensing 29 Apr.-3 May 2013, Baltimore, Md.

Both
William James, Briefer Psychology, Cambridge: Harvard University Press, 1892/1984.
K. Fukushima, Neocognitron: A self-organizing neural network model for a mechanism of pattern recognition unaffected by shift in position. Biological Cybernetics, 36(4): 93-202, 1980.
J. A. Anderson, An Introduction to Neural Networks, MIT Press, Cambridge, Mass., 1996.

What is claimed is:

1. A computer implemented Joint Proximity Association Template (JPAT) neural network method for implementing a plurality of intra-connected associative memory matrices, based on a set of hierarchical feature detection layers internal to a convolutional neural network based image classifier, the method comprising the steps of:

(a) Configure a computer for inputting a plurality of patterns of images into said convolutional neural network pre-configured to classify said images into to one of N classes of patterns of images;

(b) Configure processor of said computer to record into memory an output vector from each said feature detection layer of said network, corresponding to each said input pattern processed through said network;

(c) Retrieve from memory one input pattern stored in vector form and retrieve said input pattern's corresponding output vector from the first said detection layer; process the multiplication of said input vector by the transpose of said output vector to form a matrix of numbers and store into memory;

(d) Repeat processing step (c) for remaining said input vectors and corresponding first said detection layer output vectors to form and store into memory additional matrices;

(e) Retrieve from memory the matrices formed in steps (c) and (d) and implement said configured processor to add together said matrices to produce a single matrix of numbers; store this single matrix in memory;

(f) Invoke processor to extract from memory said single matrix and calculate a singular value decomposition (SVD) of said single matrix and store in computer memory a matrix of left-singular vectors, a diagonal matrix containing singular values on the diagonal, and a matrix of right-singular vectors;

(g) Retrieve from memory the pre-configured number N; extract from said left-singular vectors a submatrix of N vectors which correspond to the N highest singular values along said diagonal matrix; extract from said right-singular vectors a submatrix of N vectors which correspond to same N highest singular values along said diagonal matrix; invoke processor to multiply said submatrix of left singular vectors by the transpose of said submatrix of right-singular vectors to produce an associative memory matrix (AMM);

(h) Repeat steps (c)-(g) to calculate an associative memory matrix (AMM) from each of the remaining consecutive layers;

(i) Store in computer memory the plurality of said associative memory matrices to form an array of intra-connected associative memory matrices corresponding to said feature detection layers of said convolutional neural network;

(j) Configure a computer for inputting a plurality of patterns of images into said array of associative memory matrices to process and classify said images into to one of N classes of patterns of images.

2. A system facilitating the calculation of a Joint Proximity Association Template (JPAT) neural network that implements a plurality of intra-connected associative memory matrices, based on a set of hierarchical feature detection layers internal to a convolutional neural network based image classifier, wherein a processor is configured to:

(a) Configure a computer system for inputting a plurality of patterns of images into said convolutional neural network pre-configured to classify said images into to one of N classes of patterns of images;

(b) Configure system processor of said computer system to record into memory an output vector from each said feature detection layer of said network, corresponding to each said input pattern processed through said network;

(c) Retrieve from system memory one input pattern stored in vector form and retrieve said input pattern's corresponding output vector from the first said detection layer; process the multiplication of said input vector by the transpose of said output vector to form a matrix of numbers and store into system memory;

(d) Repeat processing step (c) for remaining said input vectors and corresponding first said detection layer output vectors to form and store into memory additional matrices;

(e) Retrieve from system memory the matrices formed in steps (c) and (d) and implement said configured processor to add together said matrices to produce a single matrix of numbers; store this single matrix into system memory;

(f) Invoke system processor to extract from memory said single matrix and calculate a singular value decomposition (SVD) of said single matrix and store in computer memory a matrix of left-singular vectors, a diagonal matrix containing singular values on the diagonal, and a matrix of right-singular vectors;

(g) Retrieve from system memory the pre-configured number N; extract from said left-singular vectors a submatrix of N vectors which correspond to the N highest singular values along said diagonal matrix; extract from said right-singular vectors a submatrix of N vectors which correspond to same N highest singular values along said diagonal matrix; invoke system processor to multiply said submatrix of left singular vectors by the transpose of said submatrix of right-singular vectors to produce an associative memory matrix (AMM);

(h) Repeat steps (c)-(g) to calculate an associative memory matrix (AMM) from each of the remaining consecutive layers;

(i) Store in computer system memory the plurality of said associative memory matrices to form an array of intra-connected associative memory matrices corresponding to said feature detection layers of said convolutional neural network;

(j) Configure a computer system for inputting a plurality of patterns of images into said array of associative memory matrices to process and classify said images into to one of N classes of patterns of images.

3. A computer program product for calculating a Joint Proximity Association Template (JPAT) neural network product that implements a plurality of intra-connected associative memory matrices, based on a set of hierarchical feature detection layers internal to a convolutional neural network based image classifier, said computer program product comprising a non-transitory computer readable storage medium, the non-transitory computer readable storage medium comprising computer executable instructions, wherein the non-transitory computer readable storage medium comprises instructions to:

(a) Configure a computer product for inputting a plurality of patterns of images into said convolutional neural network pre-configured to classify said images into to one of N classes of patterns of images;

(b) Configure processor of said computer product wherein the non-transitory computer readable storage medium further comprises instructions to record into memory an output vector from each said feature detection layer of said network, corresponding to each said input pattern processed through said network;

(c) Configure the non-transitory computer program product to retrieve from system memory one input pattern stored in vector form and retrieve said input pattern's corresponding output vector from the first said detection layer; process the multiplication of said input vector by the transpose of said output vector to form a matrix of numbers and store into memory;

(d) Repeat processing step (c) for remaining said input vectors and corresponding first said detection layer output vectors to form and store into system memory additional matrices;

(e) Retrieve from memory the matrices formed in steps (c) and (d) and implement said configured processor to add together said matrices to produce a single matrix of numbers; store this single matrix in memory;

(f) Invoke the non-transitory computer readable storage medium processor to extract from system memory said single matrix and calculate a singular value decomposition (SVD) of said single matrix and store in computer memory a matrix of left-singular vectors, a diagonal matrix containing singular values on the diagonal, and a matrix of right-singular vectors;

(g) Retrieve from system memory the pre-configured number N; extract from said left-singular vectors a submatrix of N vectors which correspond to the N highest singular values along said diagonal matrix; extract from said right-singular vectors a submatrix of N vectors which correspond to same N highest singular values along said diagonal matrix; invoke processor to multiply said submatrix of left singular vectors by the transpose of said submatrix of right-singular vectors to produce an associative memory matrix (AMM);

(h) Repeat steps (c)-(g) to calculate an associative memory matrix (AMM) from each of the remaining consecutive layers;

(i) Configure said non-transitory computer readable storage medium to store into memory the plurality of said associative memory matrices to form an array of intra-connected associative memory matrices corresponding to said feature detection layers of said convolutional neural network;

(j) Configure a non-transitory computer system product for inputting a plurality of patterns of images into said array of associative memory matrices to process and classify said images into to one of N classes of patterns of images.

* * * * *